Nov. 21, 1967 L. A. HOPKINS 3,353,617
GAS-CUSHION VEHICLES
Filed Aug. 9, 1965 4 Sheets-Sheet 1
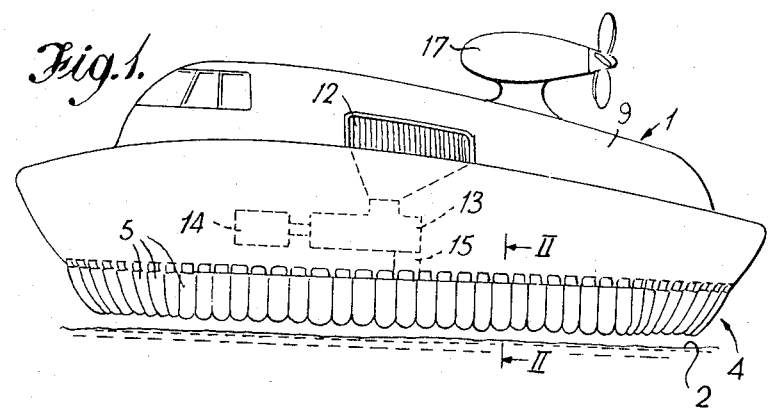
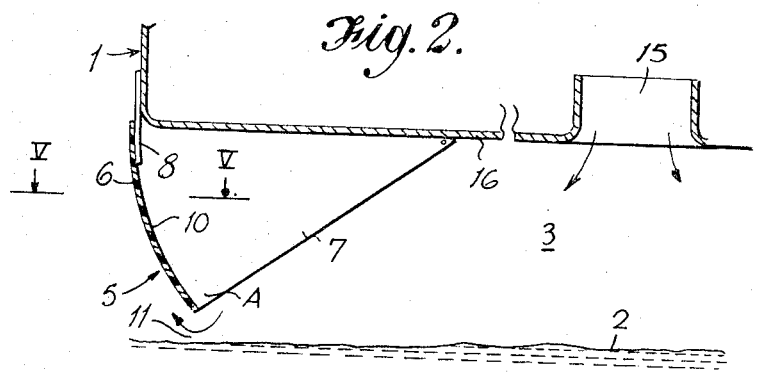
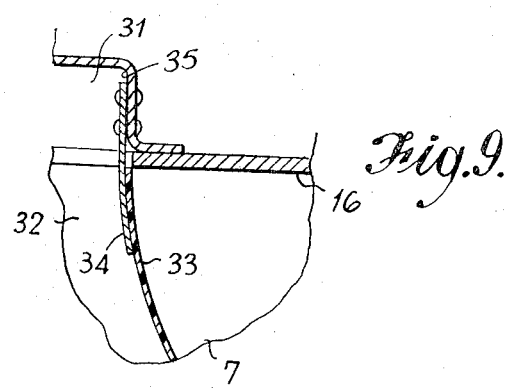
INVENTOR
L. A. HOPKINS
BY Cameron, Kerkam & Sutton
ATTORNEYS

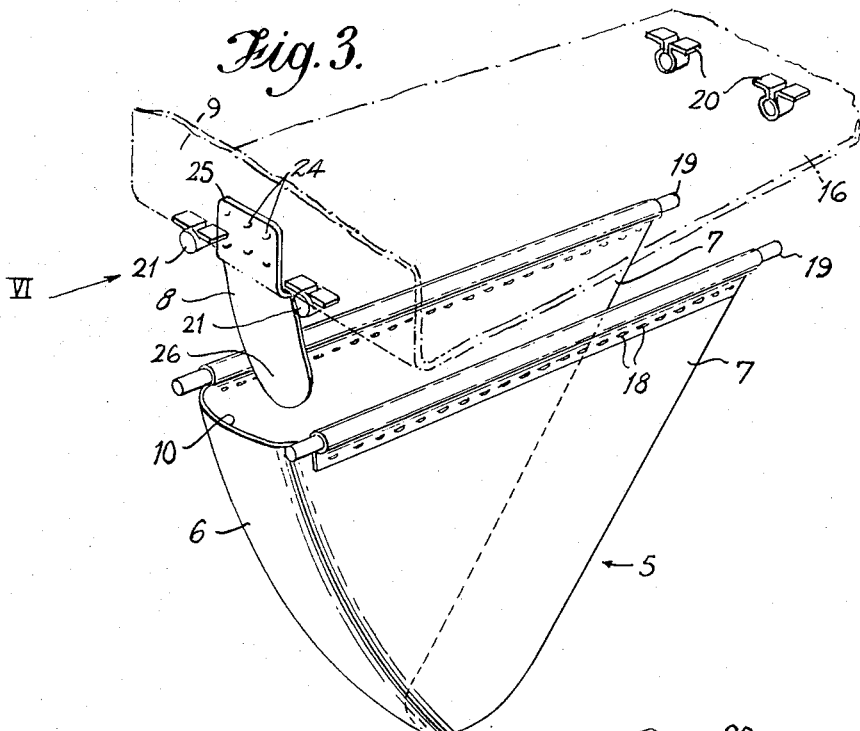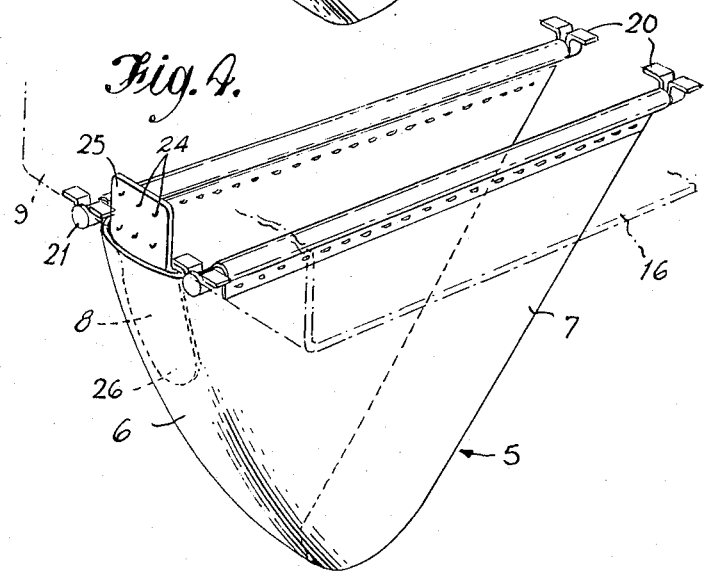

Nov. 21, 1967  L. A. HOPKINS  3,353,617
GAS-CUSHION VEHICLES
Filed Aug. 9, 1965  4 Sheets-Sheet 3
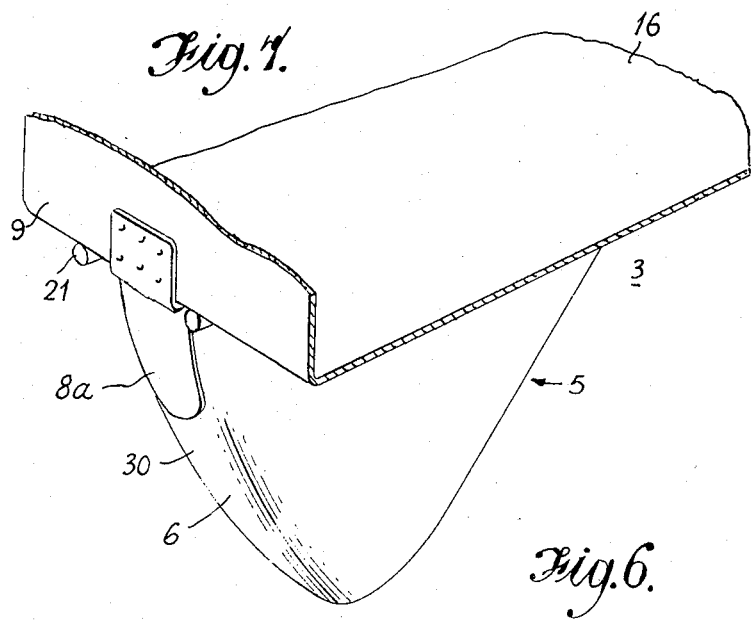
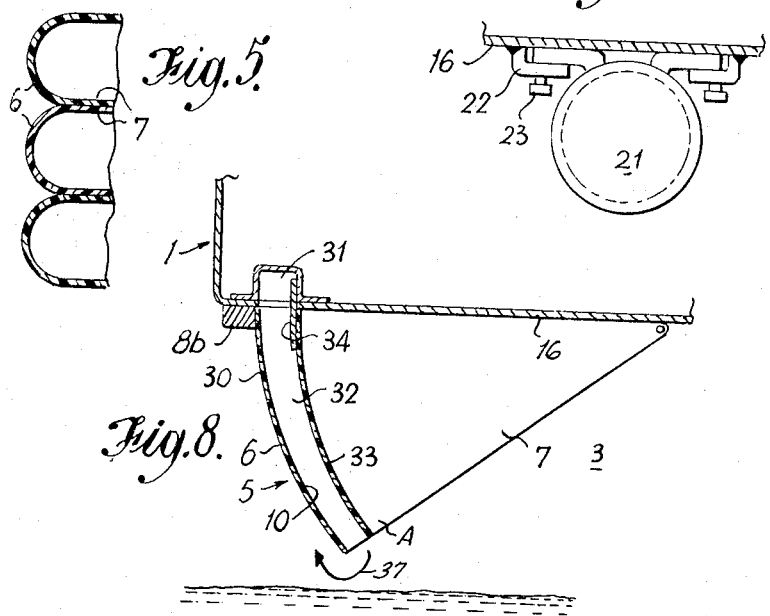
INVENTOR
L. A. HOPKINS
BY
Cameron, Kerkam & Sutton
ATTORNEYS Nov. 21, 1967　　　　L. A. HOPKINS　　　　3,353,617
GAS-CUSHION VEHICLES Filed Aug. 9, 1965　　　　　　　　　　　　4 Sheets-Sheet 4

INVENTOR
L. A. HOPKINS
BY
Cameron, Kerkam + Sutton
ATTORNEYS

United States Patent Office 3,353,617
Patented Nov. 21, 1967

3,353,617
GAS-CUSHION VEHICLES
Leslie Arthur Hopkins, Southampton, England, assignor to Hovercraft Development Limited, London, England, a British company
Filed Aug. 9, 1965, Ser. No. 478,395
Claims priority, application Great Britain, Aug. 11, 1964, 32,774/64
5 Claims. (Cl. 180—7)

ABSTRACT OF THE DISCLOSURE

An air-cushion vehicle fitted with a flexible skirt comprising a plurality of hollow, inflatable wall members with open tops is provided with means for demountably sealing the open tops of the wall members to the vehicle body. The sealing means comprise tongue-like sealing members which extend between the vehicle body and the upper portions of the wall members in overlapping relationship therewith, whereby the inflation pressure of the skirt holds the overlapping parts together. The sealing members can be attached either to the skirt or to the vehicle body, and may be disposed either inside or outside the skirt. If disposed outside the skirt, the sealing members are of rigid construction, and if disposed inside, they are of flexible construction.

---

Figure 10:
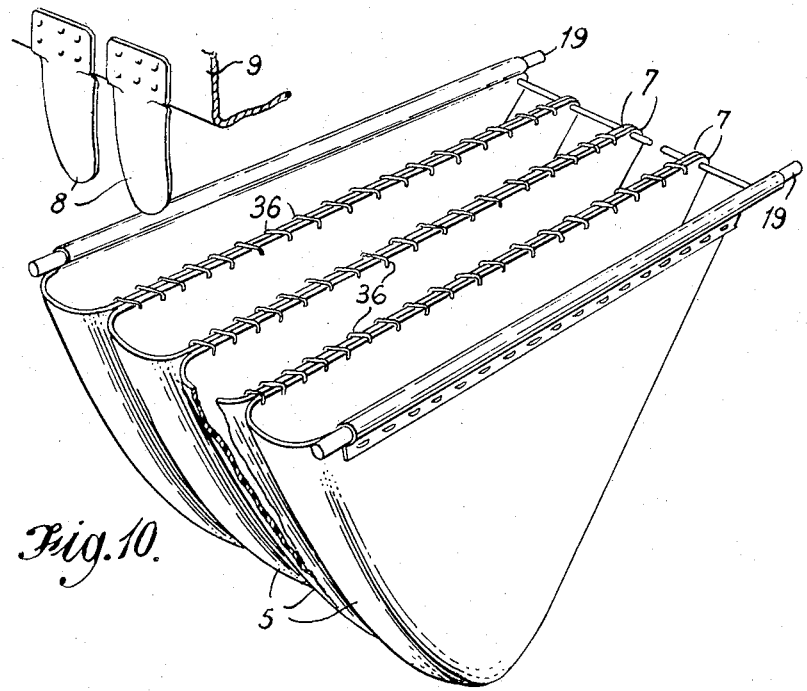

This invention relates to gas-cushion vehicles, that is, to vehicles for travelling over a surface and which, in operation, are supported above that surface by at least one cushion of pressurised gas formed and contained beneath the vehicle body.

The supporting cushion of such a vehicle may be bounded for at least part of its periphery by a downwardly projecting flexible wall member. The wall member may be formed of sheet material, inflatable to conform to a desired shape and attached to the lower periphery of the vehicle body.

The shape given to a flexible wall member is understandably dictated by its function of cushion containment but the shape so given may be such that the wall member does not lend itself to easy attachment to the vehicle body in a manner resulting in a pressure-tight relationship therebetween. One example of such a flexible wall member is disclosed in the co-pending commonly owned application of Denys Stanley Bliss, Ser. No. 267,-695, filed Mar. 25, 1963, now abandoned, wherein the cushion of a gas-cushion vehicle is bounded for part of its periphery by a plurality of separate, downwardly projecting flexible wall members attached to the lower part of the vehicle body, each wall member comprising sheet material folded to form an outer portion and two side or tie portions extending inwardly from the outer portion into the cushion space. With this form of wall member it is the curved profile (viewed in horizontal cross-section) of the outer portion which does not lend itself to easy attachment to the vehicle body.

In the case of a wall member of the kind disclosed in said co-pending application Ser. No. 267,695 the problem of attachment has been overcome in part by providing the outer portion of the wall member with lug-like extensions which are held against the vehicle body by clamping strips secured in place by screws or bolts. This arrangement, however, although providing an adequate pressure seal, does not allow rapid attachment and, in the event of damage to a wall member, does not allow the speed (and ease) of replacement desired under these conditions.

According to the present invention, a gas-cushion vehicle which, in operation, has its cushion bounded for at least part of its periphery by a flexible wall member of sheet material inflatable to conform to a desired shape, said wall member projecting downwardly from the lower part of the vehicle body, adjacent parts of the vehicle body and the wall member overlapping, whereby the overlapping parts are held together in a substantially pressure-tight relationship by inflation pressure of the flexible member.

Overlap can be provided by a component which depends from the vehicle body, and which extends either inside or outside the wall member.

If the component is to be disposed inside the wall member it should be flexible and if it is to be disposed outside the flexible member it should be stiff.

Overlap can be provided by structure integral with the vehicle body, for example, it can be provided by a step or similar structure which projects downwardly from the bottom surface of the vehicle body.

Where the inner face of the wall member provides the boundary of the cushion space, the wall member inflation pressure fluid holding the overlapping parts together is cushion gas.

Where fluid (usually gas, but it may also be a liquid, for example, water) is caused to flow downwardly over the inner face of the wall member so as to form a cushion-containing curtain of moving fluid flowing towards the surface beneath the vehicle, the wall member inflation pressure fluid holding the overlapping parts together is the curtain fluid.

Figure 11:
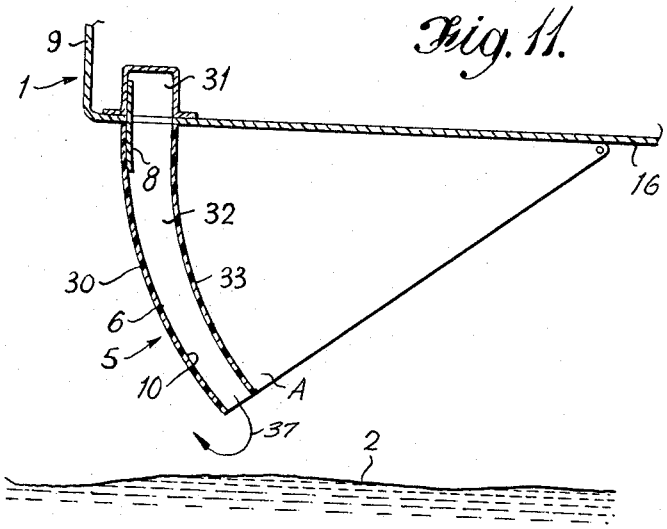

An embodiment of the invention will now be described by way of example with reference to the accompanying drawings wherein:

FIGURE 1 is a side view of a gas-cushion vehicle,
FIGURE 2 is a section, to an enlarged scale, on the line II—II of FIGURE 1,
FIGURE 3 is an "exploded" view of part of the vehicle of FIGURE 1 and an associated flexible member,
FIGURE 4 shows the same parts illustrated in FIGURE 3 but in assembled form,
FIGURE 5 is a fragmental section taken on the line V—V of FIGURE 2,
FIGURE 6 is a scrap detail looking in the direction of the arrow VI of FIGURE 3,
FIGURE 7 is a view somewhat similar to FIGURE 4 and illustrates a modification of the structure thereof,
FIGURE 8 is a view somewhat similar to FIGURE 2 and illustrates a further modification,
FIGURE 9 is a fragmentary detail, to an enlarged scale, of FIGURE 8, and
FIGURES 10 and 11 are views similar to those of FIGURES 3 and 8 respectively and illustrate modifications thereof.

Referring first to FIGURES 1 and 2, a gas-cushion vehicle 1 is supported above a land surface 2 by a cushion 3 of pressurised air formed and contained beneath the vehicle body, the cushion 3 being bounded for the whole of its periphery by a wall 4 comprising a plurality of separate, downwardly projecting flexible wall members 5 of the kind disclosed by co-pending application Ser. No. 267,695, each wall member 5 comprising (see FIGURE 2) an outer portion 6 and two side portions 7 extending inwardly from the outer portion 6 into the cushion space 3 bounded by the wall 4. A flexible component 8 of tongue-like form is attached to the vehicle body 9 and projects downwardly therefrom to overlap the inner face 10 of the outer portion 6 of the wall member 5 whereby the overlapping parts, i.e. the lower part of the component 8 and the upper portion of the inner face 10 are held in substantially pressure-tight engagement by air pressure within the cushion space 3 and contained by the member 5.

In further detail, the vehicle 1 is of the so-called "plenum chamber" type, in which air surplus to the requirements for the formation of the cushion 3 escapes to atmosphere by way of a small clearance 11 between the cushion-bounding wall 4 and the surface 2 beneath the vehicle 1.

The cushion 3 is formed by drawing in atmospheric air through an in-take 12 and by means of a compressor 13 driven by an engine 14, and, after pressurisation, supplying the compressed air to the cushion space 3 by way of a duct 15 extending into the bottom surface 16 of the vehicle body. The vehicle 1 is propelled across the surface 2 by a propeller unit 17.

Referring now to FIGURES 3, 4 and 5, each wall member 5 is cut from a single sheet of rubberised fabric (or like flexible material) curved to form a channel-shaped cross-section when viewed from above, the sides of the "channel" constituting the inner portions 7 of the wall member 5 and the channel "bottom" comprising the outer, or cushion-facing portion 6 of the wall member. As shown particularly in FIGURE 5, the wall member is inflated to conform to the desired U-like cross-section by cushion gas and the side portions 7 of each wall member are held together by cushion pressure to maintain a cushion-containing seal.

The upper edges of the side portions 7 of each wall member 5 are double back (see particularly FIGURE 3) and then secured by stitches 18 to form a pair of loops each of which locates a support rod 19. The rods 19 are attached to the bottom surface 16 of the vehicle body 9 by inboard and outboard disposed pairs of suitably-recessed brackets 20, 21. The recesses of the brackets 20, 21 have "blind" outer ends to limit axial movement of the rods 19. The flanges of the "inboard" brackets 20 are attached to the surface 16 by screws whereas the flanges of the "outboard" brackets 21 are located (see FIGURE 6) in guides 22 secured to the surface 16 and are held against the surface 16 by clamping screws 23 carried by the guides 22.

Each flexible component 8 is of the same material as a wall member 5 and the upper end 25 of a component 8 is attached to the side of the vehicle body 9 by rivets 24, the lower, tongue-like, end 26 of the component 8 projecting downwardly into the open, upper end of the wall member 5 as shown best in FIGURES 3 and 4. The lower end 26 of a flexible component 8 is slightly greater in width than the upper end 25, so as to cover more extensively the inner face 10 of a wall member 5.

To attach a wall member 5 to the vehicle body 9, the "inboard" ends of the support rods 19 are inserted into a pair of locating brackets 20, the rods 19 lifted up against the bottom surface 16, and with the end 26 of the associated flexible component 8 inserted into the "channel" defined by the member 5, the brackets 21 are slipped into place in the guides 22 and the screws 23 tightened. Build-up of cushion pressure holds the end 26 of the flexible component 8 in sealing engagement with the inner face 10 of the outer portion 6 of the flexible member.

Referring now to FIGURE 7, overlap can be provided by a component 8a of similar form to the component 8 (of FIGURES 1 to 6) but of material rigid enough to withstand substantial deflection, for example, hard rubber, the component 8a being disposed outside a wall member 5 so that pressure within the cushion space 3 holds the external surface 30 of the outer portion 6 in substantially pressure-tight engagement with the overlapping component 8a. The component 8a is slightly curved (viewed in horizontal cross-section) to co-operate more fully with the curved profile of the outer portion 6.

Referring now to FIGURE 8, overlap can be provided by a rigid stop or support member 8b attached to the bottom surface 16 of the vehicle 1 to form a peripheral "step." This arrangement is similar to the arrangement of FIGURE 7 in that pressure of fluid contained by the wall member 5 holds the outer face 30 of the member 5 against the inner side face of the overlapping stop member 8b. The said inner side face has a slight downward taper so that the stop member 8b co-operates with the slight taper of the upper, outer part of the wall member 5.

The stop member 8b, in addition to bridging the vehicle body and the wall member 5, protects the member support rods 19 (not shown in FIGURE 8) from damage when the vehicle 1 is at rest on the surface 2 i.e. when the cushion 3 is non-existent. When the vehicle 1 is so at rest the wall member 5 is in a collapsed condition, and is also protected by the member 8b. The pressure fluid holding the wall member 5 against the stop member 8b is compressed air tapped from a compressor (not shown) and fed from a peripheral duct 31 to a nozzle 32 defined by the inner face 10 and a transverse web member 33 interconnecting the side portions 7. Air issues from the lower end of the nozzle (which lower end coincides with the bottom edge of the wall member 5) to form an air curtain 37 which assists the wall member 5 in containing the cushion 3. As will be seen more clearly in FIGURE 9, a flexible, tongue-like component 34 attached to the inboard, inner face 35 of the duct 31 bridges the duct 31 and web 33 and is held in substantially pressure-tight relationship therewith by the pressure of air flow through the nozzle 32.

The "air curtain" feature of the embodiment illustrated by FIGURE 8, can, of course, be readily substituted for any of the "plenum" arrangements of FIGURES 1 to 7.

The invention provides an arrangement which is simple and allows rapid replacement of a wall member, replacement being carried out by reversing the operations described in the preceding paragraph.

With reference now to FIGURE 10, a group of wall members 5 are assembled together to form a unit which can be demountably attached to a vehicle on the lines of the arrangement described above. In this modification, two rows of flexible components 8 are provided, the components in each row being spaced apart along the sides of the vehicle body. The upper edges of adjacent side portions 7 of the wall members of the group are attached together, the rods 19 being fitted to the outer side portions 7 of the flexible members at the end of the group. Intermediate side portions 7 of the group are supported in spaced relationship by cords 36 extending through the paired upper edges of the flexible members, and attached to the vehicle body. Alternatively, they may be attached to the vehicle body by laces, or in another alternative arrangement, adjacent pairs of intermediate side portions share a single rod 19.

In a further modification of any of the foregoing arrangements, overlap can be provided by attaching an overlap component to a wall member itself instead of to the vehicle body. For example, with reference to FIGURE 11 which is a modification of the embodiment of FIGURE 8, a flexible component 8 can be attached to the wall member 5 so that the upper end of the component 8 extends into the mouth of the duct 31, and is held against the outer face thereof by pressure of the curtain-forming air flowing to the nozzle 32.

As disclosed in co-pending application Ser. No. 267,695, the inner edges of the side portions 7 of the wall members 5 are preferably at right angles to the outer portions 6. In other words, with reference to FIGURES 2 and 8, the angle A is preferably 90° as this arrangement avoids distortion of a wall member by cushion pressure.

It should be appreciated that the invention may also, or alternatively, be employed to provide a substantially pressure-tight relationship between the side portions of a wall member and the vehicle body.

I claim:
1. A gas-cushion [-cushion] vehicle which in operation has its cushion bounded for at least part of its periphery by a plurality of open-topped flexible wall members projecting downwardly from the vehicle body, said wall members being formed from sheet material inflatable to conform to desired shapes and each comprising an outer cushion-facing portion and two side portions extending inwardly from said outer portion into the space occupied by the cushion, and means for sealing the wall members to the vehicle body, said means comprising a plurality of spaced-apart components carried by one of the wall members and the vehicle body and each disposed so as to extend in overlapping relationship with a cushion-facing portion of a wall member and with the vehicle body, whereby the overlapping parts of a cushion-facing portion and a component are held together in substantially pressure-tight relationship by inflation pressure of the flexible wall member.

2. A vehicle as claimed in claim 1 wherein each component extends downwardly from the vehicle body and into the open top of the associated wall members, and wherein at least the part of the component which overlaps the wall member is flexible.

3. A vehicle as claimed in claim 1 wherein each component comprises a member of substantially rigid material extending between the vehicle body and the external surface of the outer cushion-facing portion of the associated wall member.

4. A vehicle as claimed in claim 1 wherein said wall members are demountably attached to the vehicle body along the side portions of said wall members.

5. A vehicle as claimed in claim 1 wherein a plurality of wall members are grouped together, with adjacent side portions of neighbouring wall members attached to each other, and means are provided for demountably attaching the grouped wall members to the vehicle body along the side portions of the two wall members at the extremities of the group.

References Cited
UNITED STATES PATENTS

| | | | |
|---|---|---|---|
| 3,139,947 | 7/1964 | Beardsley | 180—7 |
| 3,191,705 | 6/1965 | Jones et al. | 180—7 |
| 3,211,246 | 10/1965 | Lewis | 180—7 |
| 3,251,432 | 5/1966 | Fischer et al. | 180—7 |
| 3,260,323 | 7/1966 | Henry | 180—7 |
| 3,291,237 | 12/1966 | Hopkins et al. | 180—7 |

A. HARRY LEVY, *Primary Examiner.*